United States Patent Office

3,053,721
Patented Sept. 11, 1962

3,053,721
PROCESS FOR SPLICING PAPER, PROCESS FOR PREPARING A HEAT HARDENABLE FILM AND HEAT HARDENABLE POLYVINYL ACETATE COMPOSITION
Leo M. Germain, Shawinigan, Quebec, Canada, assignor to Shawinigan Chemicals Limited, Montreal, Quebec, Canada, a corporation of Canada
No Drawing. Filed July 20, 1959, Ser. No. 828,047
11 Claims. (Cl. 156—157)

This invention relates to the preparation of novel resinous compositions of polyvinyl acetate and a process of using the resins as a heat-hardenable adhesive, e.g. for splicing paper.

It has long been known that lapped splices can be used to join the ends of webs of paper being wound on a roll, the join being secured by heat-sealing the splices with a film of thermoplastic resin. This method of splicing is described by Freeman and Morin in Pulp and Paper Magazine of Canada, Convention issue, 1937, pages 168–169. Heretofore these splices have been made with rubber, with cellulose acetate moistened with solvent, or with polyvinyl acetate or partially hydrolyzed polyvinyl acetate as the heat-sealing adhesive resin. Polyvinyl acetate has generally been the preferred resin for making the splices.

It has been found however that when splices made with polyvinyl acetate as the adhesive resin are subjected to tension under the high temperatures occurring in modern high speed printing presses, the splices are prone to separate, causing a break in the web of paper passing through the printing machine. Failure of the polyvinyl acetate resin bond in the splice is due to the thermoplasticity of the polyvinyl acetate. It is an object of this invention to provide a new polyvinyl acetate resinous composition which forms a heat hardenable film suitable for forming splices in webs of paper, which splices will not separate under tension in the elevated temperature conditions of modern high speed printing presses.

It has been observed, hitherto, that it is possible to form cured plasticized polyvinyl acetate compositions by mixing with the polyvinyl acetate and plasticizer a metal halide, for example ferric chloride or stannic chloride, and heating to temperature above about 250° F. This curing or vulcanizing action has been obtained with proportions of metal halide in the range below about 2% by weight of the polyvinyl acetate. The products are rubbery compositions advocated as substitutes for natural rubber.

It has now been found that a desirable film of heat hardenable adhesive polyvinyl acetate can be prepared by dissolving polyvinyl acetate in a solvent to form a solution of polyvinyl acetate, dissolving a vulcanizing material of the group consisting of ferric chloride and stannic chloride in the solution in an amount equal to between 3 and 10% by weight of the polyvinyl acetate, casting the resulting solution onto a smooth surface in a thin layer, and evaporating the solvent at temperatures below about 175° F. to leave a dried film of heat hardenable polyvinyl acetate. The dried film is utilised as an adhesive by placing it as an interlayer between two surfaces to be adhesively secured, e.g. two sheets of material to be bonded, and heating the interleaved materials to a curing temperature between 325–475° F. under slight pressure for sufficient time for the film to achieve a temperature in this curing temperature range; the film thus sets to a heat hardened bond. When webs of paper are to be spliced, it is preferred to use a film containing 3–6% by weight ferric chloride or stannic chloride, whereby the curing time can be less than 5 seconds, and even less than 1 second, and splices can be made in the conventional manner by passing a hot iron over the splices by hand, at 350–450° F.

The polyvinyl acetate used in preparing the film is preferably one having a viscosity between 4 and 20 centipoises as measured at 20° C. on a benzene solution containing 86 grams of the polyvinyl acetate per litre. Polyvinyl acetates having higher viscosities (and correspondingly higher molecular weights) require somewhat higher temperatures for heat-sealing, which scorch paper being spliced or cause the bonding composition to cure without forming a satisfactory adhesive bond. Polyvinyl acetates having lower viscosities (and correspondingly lower molecular weights) form films which are somewhat weaker and inadequately self-supporting.

Suitable solvents for the preparation of films of polyvinyl acetate according to the invention are the common solvents for polyvinyl acetate which are also solvents for the vulcanising agent, for example benzene, toluene, methanol, acetone, methyl acetate, and ethyl acetate.

To facilitate handling the films before final use in an adhesive bond, it is desirable that it have some flexibility, and unplasticized polyvinyl acetate films are somewhat brittle. Hence it is preferable to have a few percent of plasticizer for polyvinyl acetate in the film. Most preferably an ester plasticizer, for example dibutyl phthalate and diacetin, to the extent of about 5–10% by weight of the polyvinyl acetate is incorporated into the solution from which the films are cast. Other known plasticizers for polyvinyl acetate, for example tricresyl phosphate, are also satisfactory.

Ferric chloride (in its anhydrous or its hexahydrate form) and stannic chloride are the suitable vulcanising agents for polyvinyl acetate for purposes of this invention, because in reasonable proportion they provide adequate curing of polyvinyl acetate to heat hardened material in conveniently short curing time. Furthermore they can be admixed with the polyvinyl acetate at any time prior to heating to the curing temperature, and the uncured mixtures are stable during indefinite storage so long as they are not subjected to temperatures in the vulcanising or curing range.

The proportions of curing agent must be high enough to provide adequate curing in reasonably short periods, and must not be so high as to cause the cured product to be too rigidly vulcanised and brittle. Proportions between 3 and 10% by weight of the polyvinyl acetate are adequate for these purposes, and proportions between 3–6% are preferred.

*Example*

A sample of the material of this invention was prepared, starting with the following ingredients:

| | Parts by weight |
|---|---|
| Gelva V–10 (polyvinyl acetate of 10 centipoise viscosity as previously defined) | 33 |
| Dibutyl phthalate | 2 |
| Ferric chloride hexahydrate | 1.65 |
| Methanol | 65 |

These ingredients were mixed at room temperature to form a mobile solution. The solution was then continuously cast on to the feed end of the upper run of a smooth polished flexible continuous travelling belt and subjected to temperatures in the range 105–140° F. for about 8 minutes, during which time the methanol evaporated leaving a dried film about 2 mils thick on the belt. The dried film was continuously removed from the discharge end of the travelling belt and wound on a roll interleaved with a thin sheet of paper to protect the film from self-adhesion. Two webs of paper were spliced by overlapping the two adjoining ends for a distance of about an inch and placing a strip of the dried film between the overlapped ends; the overlapped ends were then adhesively bonded by passing a hot iron along the overlap. The iron had a pressing surface of about 24 square inches and the total weight on this surface during the heat-sealing operation was about 35 lbs., hence the curing pressure was below 2 lbs. per square inch. The iron was at a temperature of 400° F. and contacted each section of the splice for about 2–3 seconds. The resulting splice was strong and the polyvinyl acetate resin in it was heat cured and no longer thermoplastic, hence the splice would not come apart under tension at elevated temperatures.

It will be readily understood by those skilled in the art that numerous modifications may be made in the specific expedient described without departing from the invention as defined in the following claims.

I claim:

1. A process for the preparation of a heat hardenable film of splicing tape comprising dissolving polyvinyl acetate in an organic solvent to form a solution of polyvinyl acetate, dissolving a vulcanising material selected from the group consisting of ferric chloride and stannic chloride in the solution in an amount equal to between 3–10% by weight of the polyvinyl acetate, casting the resulting solution on to a smooth surface in a thin layer and evaporating the solvent at temperatures below about 175° F. to leave a dried film of heat hardenable polyvinyl acetate.

2. A process as claimed in claim 1, in which the polyvinyl acetate has a viscosity as defined herein, between 4 and 20 centipoises.

3. A process as claimed in claim 2, in which the solvent is selected from the group consisting of benzene, toluene, methanol, methyl acetate, ethyl acetate, and acetone.

4. A process as claimed in claim 3, in which the amount of vulcanizing material is in the range between 3 and 6% by weight of the polyvinyl acetate.

5. A process as claimed in claim 4, in which a plasticizer for the polyvinyl acetate, in a proportion between 5–10% by weight of the polyvinyl acetate, is included in the solution of polyvinyl acetate.

6. A process as claimed in claim 5, in which the plasticizer is dibutyl phthalate.

7. A heat hardenable mixture comprising polyvinyl acetate and 3–10%, by weight of the polyvinyl acetate, of a curing agent selected from the group consisting of ferric chloride and stannic chloride, said mixture having been formed by mixing the ingredients and an organic solvent therefor at a temperature below about 175° F.

8. A heat hardenable mixture as claimed in claim 7, including also 5–10% by weight of the polyvinyl acetate of a plasticizer for the polyvinyl acetate.

9. Heat hardened adhesive film, prepared by casting a solution of the composition claimed in claim 7 in a thin layer, evaporating solvent from the solution at a temperature below about 175° F. to form a dried film, and hardening the film at a temperature of 325–475° F. under pressure between surfaces to be adhesively secured.

10. A process for preparing a heat hardened adhesive film comprising (1) forming, in an organic solvent, a solution of polyvinyl acetate and 3–10% by weight of the polyvinyl acetate of a curing agent selected from the group consisting of ferric chloride and stannic chloride, (2) casting a layer of the solution on a smooth surface, (3) evaporating solvent from the layer at temperatures below about 175° F. to form a dried film, and (4) heating the dried film to a temperature between 325–475° F. for a time not exceeding 5 seconds between surfaces to be adhesively secured.

11. A process for splicing paper comprising (1) placing between overlapping edges of the pieces of the paper to be spliced a self-supporting film of polyvinyl acetate containing between 3 and 6% by weight of a vulcanizing agent selected from the group consisting of ferric chloride and stannic chloride, and (2) subjecting the overlapping edges to pressure and to heat in the range between 350 and 450° F., whereby a heat hardened splice is formed which will not separate under renewed heating of the splice under tension.

References Cited in the file of this patent

UNITED STATES PATENTS

| | | |
|---|---|---|
| 1,672,157 | Herrmann et al. | June 5, 1928 |
| 2,444,396 | Collins et al. | June 29, 1948 |
| 2,587,833 | Germain | Mar. 4, 1952 |
| 2,686,748 | Wolfe et al. | Aug. 17, 1954 |

FOREIGN PATENTS

| | | |
|---|---|---|
| 558,100 | Great Britain | Dec. 21, 1943 |

OTHER REFERENCES

Ellis: "The Chemistry of Synthetic Resins," Reinhold Publishing Corp., New York, 1935, volume 1, pages 50 and 371.

Freeman et al.: "Pulp and Paper Magazine of Canada" Convention Issue, 1937, pages 168–169.